(12) United States Patent
Alff et al.

(10) Patent No.: US 7,104,611 B2
(45) Date of Patent: Sep. 12, 2006

(54) MOTOR VEHICLE WHEEL DISC, IN PARTICULAR FOR PASSENGER CAR

(75) Inventors: Denis Alff, Riom (FR); Wolfgang Kruchten, Wuppertal (DE)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/850,376

(22) Filed: May 21, 2004

(65) Prior Publication Data

US 2005/0017570 A1    Jan. 27, 2005

Related U.S. Application Data

(63) Continuation of application No. PCT/EP02/13078, filed on Nov. 21, 2002.

(30) Foreign Application Priority Data

Nov. 23, 2001   (FR)   .................................. 01 15560

(51) Int. Cl.
    *B60B 3/04* (2006.01)
(52) U.S. Cl. ........................ 301/63.107; 301/64.101; 301/35.621
(58) Field of Classification Search .......... 301/95.101, 301/95.102, 95.104, 95.105, 95.106, 64.1, 301/104, 67, 69, 65, 63.101, 63.103, 63.105, 301/63.106, 64.101; 29/894.323, 894.325, 29/894.322; 152/381.3, 381.4
    See application file for complete search history.

(56) References Cited

U.S. PATENT DOCUMENTS

| | | | |
|---|---|---|---|
| 2,047,137 A | * | 7/1936 | Eksergian ................ 301/35.59 |
| 2,116,598 A | | 5/1938 | Eksergian |
| 2,123,099 A | * | 7/1938 | Eksergian et al. ....... 301/35.59 |
| 2,317,311 A | | 4/1943 | Stough |
| 2,407,749 A | | 9/1946 | Sinclair |
| 2,453,512 A | | 11/1948 | Jacob |
| 3,366,421 A | | 1/1968 | Bradley |
| 4,256,347 A | * | 3/1981 | Reppert ................. 301/64.101 |
| 5,431,486 A | * | 7/1995 | Kamahori .............. 310/63.104 |
| 5,951,114 A | * | 9/1999 | Marron et al. ......... 301/63.101 |
| 6,042,194 A | | 3/2000 | Fitz et al. |
| 6,231,129 B1 | * | 5/2001 | Stach .......................... 301/65 |
| 6,754,957 B1 | * | 6/2004 | Coleman et al. ....... 29/894.344 |

FOREIGN PATENT DOCUMENTS

| | | |
|---|---|---|
| DE | 26 39 483 | 3/1978 |
| DE | 201 08 995 | 10/2001 |

* cited by examiner

Primary Examiner—Frantz F. Jules
(74) Attorney, Agent, or Firm—Buchanan Ingersoll & Rooney PC

(57) ABSTRACT

Wheel disc, comprising a radially outer circular assembling part, a radially inner fixing and centering part with a bearing region comprising a given number of fixing apertures and ending radially inwardly with a centering vent, and arms connecting the inner and outer parts, each arm being disposed substantially opposite to one of the fixing apertures and the radially inner free edges of the radially outer circular part defining with the lateral free edges of the arms perforations, in which, in order to reinforce each arm mechanically, a pocket is housed, set back axially inwards relative to the outer face of the disc and in which a yoke connects each arm to the centering vent.

25 Claims, 4 Drawing Sheets

MOTOR VEHICLE WHEEL DISC, IN PARTICULAR FOR PASSENGER CAR

This application is a continuation of International Application PCT/EP02/13078 filed on Nov. 21, 2002 and which claims priority of Patent Application Serial No. 01/15560 filed in France on Nov. 23, 2001, the entire content of which is hereby incorporated by reference.

BACKGROUND OF THE INVENTION

The invention relates to a motor vehicle wheel disc with arms, in particular for passenger car, formed in one piece from embossed sheet metal, which represents an excellent compromise in terms of weight, cost, style or freedom of possible added styling (decorative wheel cover for example).

In the designing of a sheet metal wheel for a motor vehicle, the general aim is to optimise the weight and cost of such a product. The development of embossing techniques, numeric simulation means, and materials has led to great progress over the last few years. However, the majority of products has remained within the concept of a substantially axisymmetric disc (i.e. one whose cross-sectional profile is virtually fixed in form), comprising perforations and sometimes embossing in the upper part.

This type of profile does not give the product a very enhanced style or image, which explains in most cases why manufacturers resort to a decorative wheel cover placed on the product when it is mounted on the vehicle.

One can count several attempts to create style directly from the sheet metal forming the wheel disc by forming deep embossed areas forming stiffeners and/or a particular assembly of the disc with the rim (under-seat, "full-face" assembly (i.e. disc whose radially outer edge includes the outer flange and seat of the rim), with the rim welded at the end, etc.) and sometimes associated with effects connected to painting. These attempts have not yet led to generalisation for reasons of excessive weight or difficulties in execution.

In general, the market for styled wheels for passenger cars is confined to the use of aluminium alloys. The process of manufacture (moulding, forging etc.) of these discs allows very broad freedom of style at reasonable weights, but has the disadvantage of being 4 to 8 (even 10) times more expensive.

The specification of DE 201 08 995-U discloses a wheel whose disc is formed from a single piece of embossed sheet metal, with an outer face and an inner face. This disc has a radially outer circular assembling part intended to be connected to a rim, a radially inner part for fixing and centering to a wheel hub with a bearing area having a given number of fixing apertures and ending radially inwardly with an edge which is turned axially outwardly or centering vent (aperture), and spokes connecting the inner and outer parts, each arm being disposed substantially opposite to one of the fixing apertures and the radially inner free edges of the radially outer circular part defining perforations with the free lateral edges of the arms. This disc has a substantially circular, plane bearing region and each arm comprises two lateral stiffening elements which extend radially from the bearing area to the radially outer circular assembly part and are disposed on either side of an intermediate strip axially set back towards the interior of the disc.

Although freedom of styling either bare or with an attached part (decorative wheel cover for example) is apparently obtained, such a disc has the disadvantage of requiring a relatively thick sheet metal to be able to withstand the forces to which it is subjected during operation, in particular in the joining region between the arms and the radially inner part for fixing and centering the disc.

Hereinafter:
- the "outer face" of the disc will refer to the surface of revolution generated by rotation about the axis of rotation of the disc of the regions of the disc disposed axially outermost;
- the "internal face" of the disc, to the side of the disc oriented inwards, in particular the internal face of the bearing region is intended to come into contact with the outer surface of the wheel hub to which the disc is to be fixed;
- and the "external face" of the disc, to the side of the disc oriented outwards, which side is visible when the wheel is mounted on the vehicle.

SUMMARY OF THE INVENTION

The object of the invention is a similar wheel disc in which, in order to reinforce each arm mechanically, a pocket is housed in a position set back axially inwardly relative to the outer face of the disc, the pocket extending radially from the centering vent and including a fixing aperture and the adjacent part of the bearing region, along the central part of the arms and as far as the outer circular assembling part and in which the outer face connects each arm to the centering vent by a yoke offset axially outwardly relative to the bearing region.

The particular geometry of the radially inner part for fixing and centering the disc has the advantage of reducing the stress peaks withstood by this region during operation.

According to an advantageous embodiment, and taking into account a median axial plane between two adjacent fixing apertures, the axial distance separating the internal face of the yokes and the internal face of the bearing region is at all points greater than the initial thickness of the sheet metal forming the wheel disc.

Preferably, each pocket has a floor and a single closed side surrounding the floor. Each pocket therefore has a closed geometry.

According to a preferred embodiment, the arms have lateral edges turned down towards the inner face of the disc and have a section substantially in the shape of an M. It is advantageous if at a given radial distance, the lateral edges are offset axially outwardly relative to the inner face of the floor of the pocket of the arm. This arrangement has the advantage of limiting the consequences of pressure peaks on the arms during operation by preventing these pressure peaks from being transmitted to the more sensitive cut-out edges.

According to another preferred feature of the invention, the edges of the perforations are obtained by punching sheet metal and then folding down towards the internal face of the disc. This has the advantage of releasing a maximum of the perforated area and to ensure that no cut-out face is visible from the outer side.

Furthermore the aesthetic thus obtained is pleasing and the strong perforation lends, in addition to good ventilation of the brakes, considerable freedom of added style (decorative wheel cover).

The pockets may advantageously have a generally flattened oval shape with a width in the circumferential direction decreasing continuously from the fixing aperture to the radially outer circular part. In the same way, the pockets may have a depth which decreases continuously from the radially inner part to the radially outer circular part. The width, section and bending-resistance of the arms in the circumferential direction may also advantageously continuously decrease from the radially inner part to the radially outer circular part.

The object of these arrangements is to distribute the material in the best way in the arm where it is needed to reduce pressures during operation according to the stresses to which the arm is subjected.

Each bearing region about each fixing aperture may have at least two distinct bearing faces. Preferably, relative to the axis of a fixing aperture, the bearing region has a first bearing face disposed radially inward and two other bearing faces disposed axially outward and circumferentially on either side of the fixing aperture.

Advantageously, the floor of the pockets may have convex or concave regions. It may also have punched holes. Such a hole may be a standard perforation or act as a fixing for a styled part such as a decorative wheel cover.

The final shape of the arms and of the perforations of the discs according to the invention may be obtained simultaneously in one or more embossing operations. Preferably, after being cut out, the edges of the perforations are trimmed from an embossed part before being turned down.

The radially inner part of the centering vent may also comprise preferred bearing distances opposite to each fixing aperture or each yoke separating the fixing apertures.

Finally, the number of arms may be in particular 3, 4, 5 or 6.

The invention thus describes a wheel disc whose weight and method of manufacture are similar to those of a conventional steel disc optimised for a style approaching that of moulded or forged alloy discs.

The invention also has as a subject a wheel formed by the assembly of a rim and a disc according to the invention.

DESCRIPTION OF THE DRAWINGS

Wheel discs according to the invention will now be described by means of the attached drawing in which.

DESCRIPTION OF PREFERRED EMBODIMENTS

Figure 1:
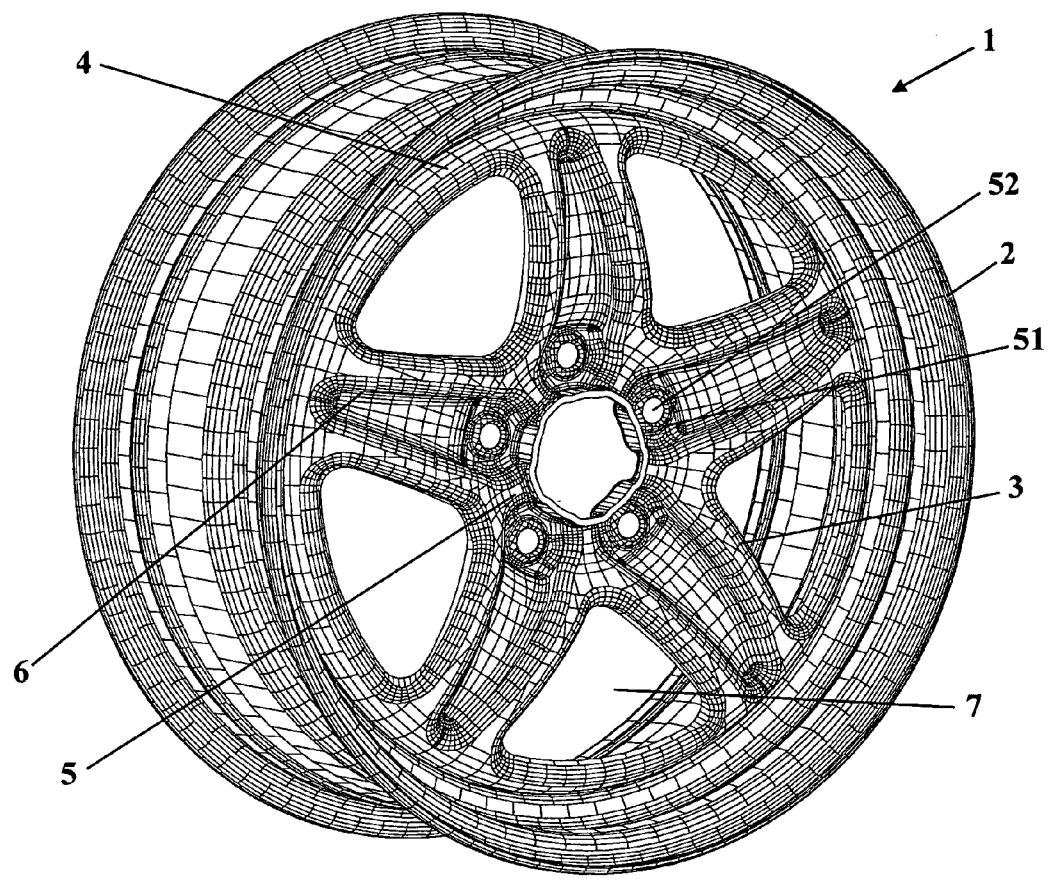
FIG. 1 is a perspective view of an assembled wheel having a disc according to the invention.
Figure 2:
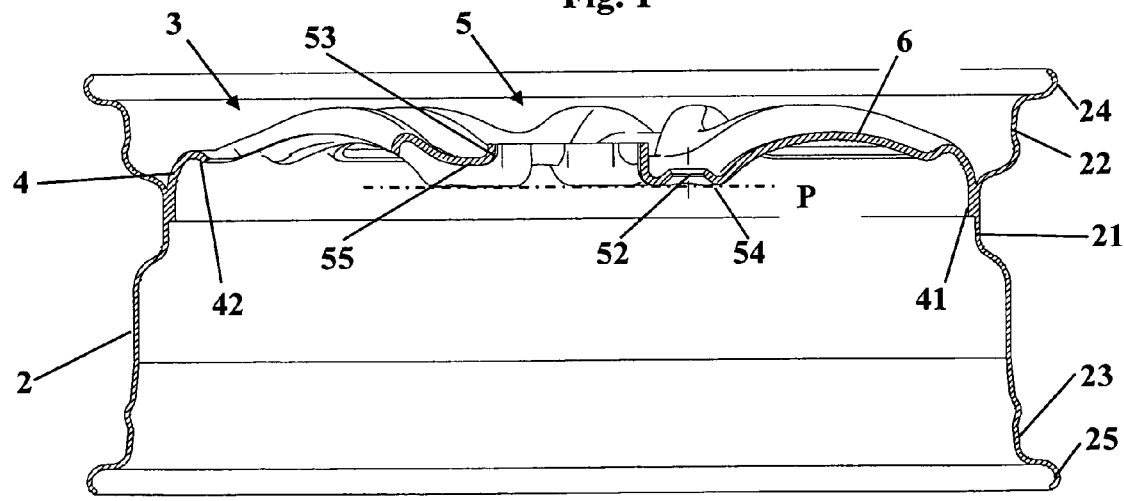
FIG. 2 is a view in axial section of the wheel of FIG. 1 along the axis of a fixing aperture.

FIG. 1 shows a perspective view of the outer side (or external face) of an assembled wheel 1 having a disc 3 according to the invention and a rim 2. FIG. 2 is an axial section of the same wheel through the axis of a fixing aperture. The rim 2 usually comprises two outer 24 and inner flanges 25, two outer 22 and inner seats 23, and a well 21.

The disc 3 is manufactured by moulding, in particular embossing, from a sheet metal blank composed preferably of high-strength steel or aluminium. The essential components of the disc 3 are a radially outer circular assembling part 4, a radially inner centering and fixing part 5, and linking arms 6 between the parts 4 and 5.

The part 4 is a assembling region with the rim 2, as FIG. 2 shows, and the radially outer edge 41 of this assembling part 4 has a direction substantially parallel to the axis of rotation of the disc 3. This assembling part 4 is circular, i.e. circumferentially continuous. Assembling on the rim 2 is usually effected by soldering. This may take place at the well 21 of the rim 2. It is also possible to effect assembling under the outer seat 22 of the rim 2.

Figure 4:
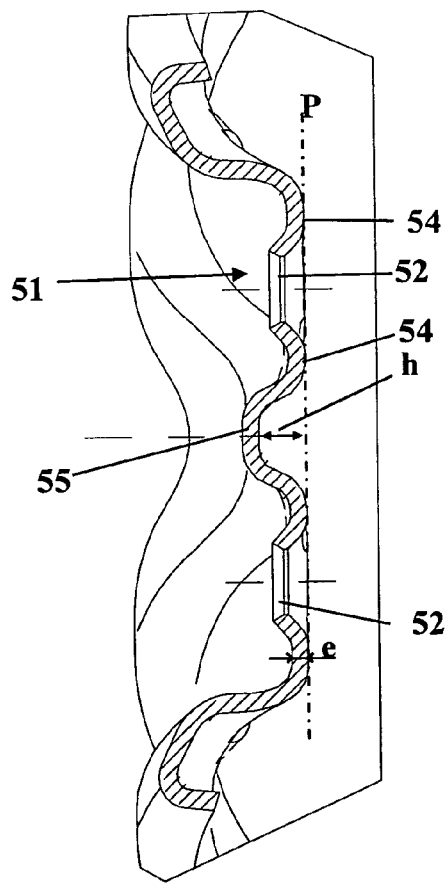
FIG. 4 is a view in section of the disc through the axes of two adjacent fixing apertures.

The fixing and centering part 5 in this case has a bearing region 51 with five fixing apertures 52 and a radially inner edge curved axially outward in the form of a collar or centering vent 53. The fixing apertures 52 are conceived to receive fixing bolts of the disc to a wheel hub of the vehicle. The internal face of the bearing region 51 has a bearing face 54 intended to come into contact with the hub of the vehicle. This bearing face 54 corresponds to the plane P. As FIG. 4 shows, with a section of the disc 3 between two adjacent fixing apertures 52, the bearing region 51 as well as the bearing face 54 are interrupted between two fixing apertures by a yoke 55. Preferably, the axial distance h between the plane P of the bearing face 54 and the inner face of the yoke 55, in its central region, is greater than the thickness e of the starting sheet metal blank. This thickness e is between 3 and 6 mm according to the load that the wheel in question is to bear. Each yoke is defined by a bent portion of the piece of sheet metal and forms a generally concave side facing axially outwardly, and a generally convex side facing axially inwardly. An axially inner surface of the yoke is offset axially outwardly from the plane P.

The arms 6 connect the parts 4 and 5 and ensure the transmission of forces between these two parts of the disc 3. The lateral edges of these arms 6 together with the radially inner edge of the assembling part 4 define large perforations 7.

The problem of realising a wheel disc 3 having large perforations 7 is to make the arms 6 which laterally define these perforations sufficiently resistant to the fatigue stresses which arise during operation.

Figure 3:
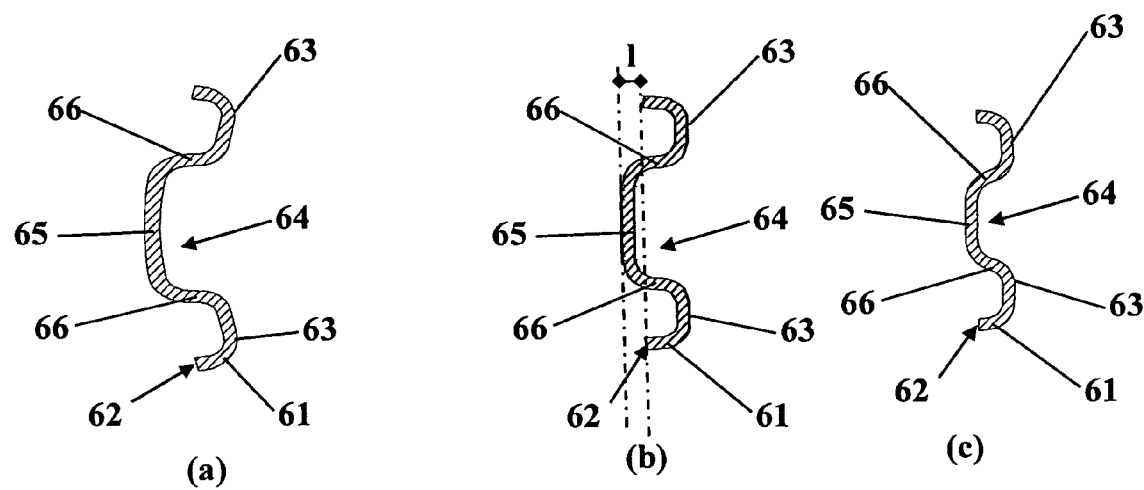
FIGS. 3(a) to 3(c) show the development of the section of an arm of the center of the disc towards the exterior.

FIGS. 3(a) to (c) show the development of the section of an arm 6 of the joining region with the fixing and centering part 5 towards the assembling part 4. It can be seen that the section of these arms 6 substantially has an M shape. The M profile is obtained by two outer zones 63 with two lateral edges 61 and a pocket 64 disposed at the center of the arm with a floor 65 and two adjacent sides 66. The two outer regions 63 form part of the outer face of the disc. In the embodiment in FIG. 1, the pockets 64 have a generally oval shape and each include a bearing region 51 with a fixing aperture 52. The side 66 surrounds part of the centering vent and thus completely surrounds the floor 65, so that one could say the pockets are closed. The free edges of the cut-out 62 of the two lateral edges 61 of the arms 6 are folded down towards the inside of the disc, which completes the M profile. Preferably, the axially inwardly facing faces of the free edges of the cut-out 62 are also axially set back outwardly relative to the axially inwardly facing face of the floor 65 of the pocket 64 by a distance I, as is shown in FIGS. 3(a) to 3(c). The axial height of the reinforcement side 66 of the pocket 64 relative to the two outer regions 63 as well as the width of the floor 65 of the pocket 64 decrease progressively whereas the radial distance from the axis of the disc increases. This is shown in FIGS. 3(a), 3(b) and 3(c).

In the example described, the assembly of the free edges of the cut-out of the arms 62 and the assembling part 42 all around the perforations 7 are folded down towards the internal face of the disc 3. This makes it possible, in addition to lending additional rigidity, to increase the area of the perforations 7 and to give a more pleasing stylistic effect due to the disappearance of the areas where there are cut-outs, whose sharp ridges are not very attractive.

As the arms are subjected to high bending forces, the highest stresses during operation are concentrated on the external and internal faces of the disc. As the cut-out ridges are particularly sensitive to concentrations of stress, the fact that the folding back of the cut-out edges remains set back both with respect to the external and internal faces of the arms ensures that the stresses undergone by the cut-out ridges remain acceptable.

FIGS. 1 and 2 show that the adjacent outer regions 63 of two adjacent arms 6 join at the link with the fixing and centering part 5 and are extended in this part 5 by the yokes 55 as far as the vent 53.

The fixing and centering region 5 is thus composed in the disc according to the invention of bearing regions 51 each surrounding a fixing aperture 52, the adjacent bearing regions 51 being separated by yokes 55 as well as a centering vent 53.

Figure 5:
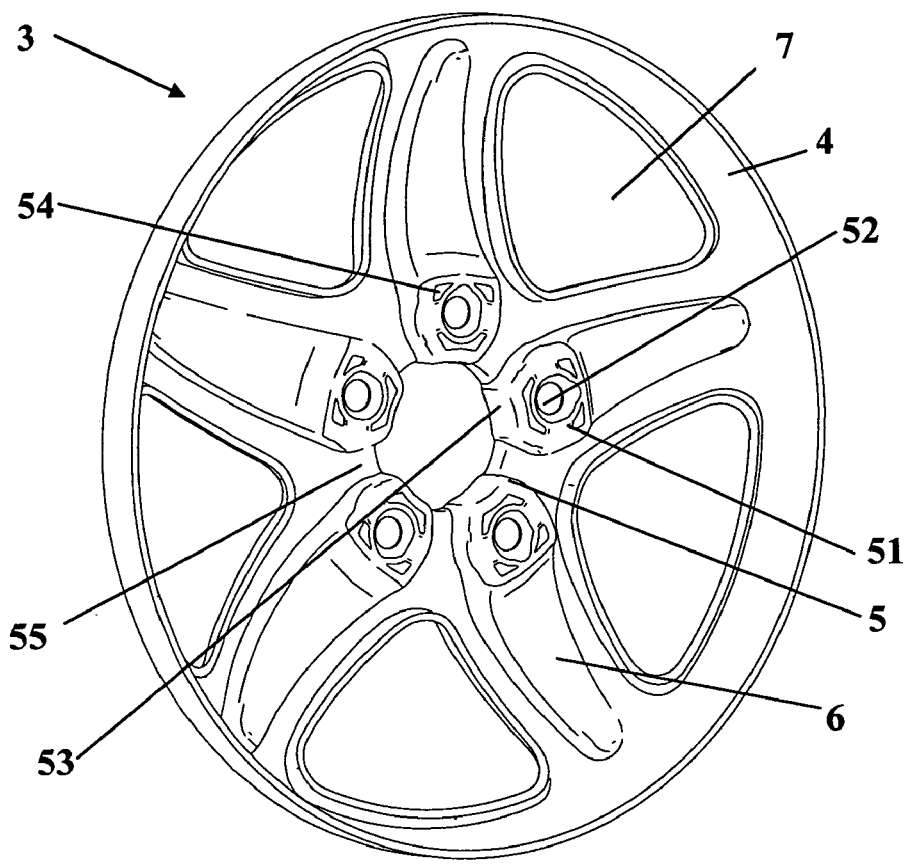
FIG. 5 is a perspective view of the internal face of the disc.

FIG. 5 shows a perspective view of the internal face of an embodiment of the disc 3 according to the invention. It shows in particular the fixing and centering part 5 having the five bearing regions 51 disposed around the five fixing apertures 52, the five yokes 55, and the centering vent 53.

Figure 6:
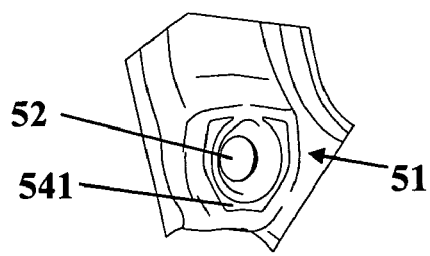
FIGS. 6, 7, 8 and 9 are enlargements of one of the fixing apertures of FIG. 5 and show four modified embodiments of the bearing faces.
Figure 7:
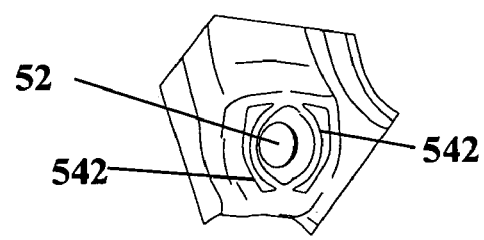
Figure 8:
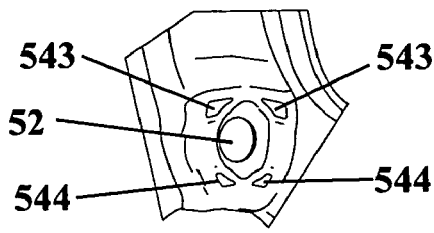
Figure 9:
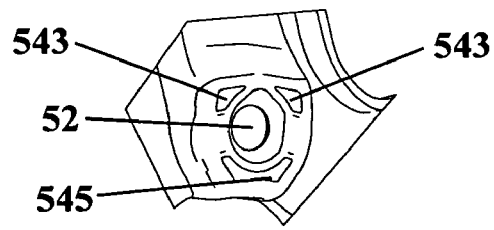

FIGS. 6 to 9 show four particular embodiments of the bearing faces 54 of the bearing regions 51. FIG. 6 shows a first embodiment in which the bearing face 541 is unique and surrounds the fixing aperture 52 with only one interruption which is radially outward relative to the fixing aperture. In FIG. 7, the bearing face is composed of two faces 542 disposed circumferentially on either side of the fixing aperture 52. In FIG. 8, the bearing face is composed of four faces 543 and 544, two faces 543 disposed circumferentially on either side of and radially outward relative to the axis of the fixing aperture 52 and two faces 544 disposed circumferentially on either side of and radially inward relative to the axis of the fixing aperture 52. The bearing face of FIG. 9 itself has three bearing faces, two faces 543 as above and one face 545 disposed radially inward relative to the axis of the fixing aperture 52. The geometry of the bearing faces makes it possible to distribute the regions of concentration of stress in the bearing region and in the particular case of the disc 3 shown here, the embodiment in FIG. 9 is preferred.

The forces transmitted by the bending of one arm are thus borne simultaneously by the two radially upper bearing faces 543, the radially inner bearing face 545 (or 544), but also by the bearing faces of the adjacent fixing apertures 52 via the yoke 55/vent 53 torque.

Figure 10:
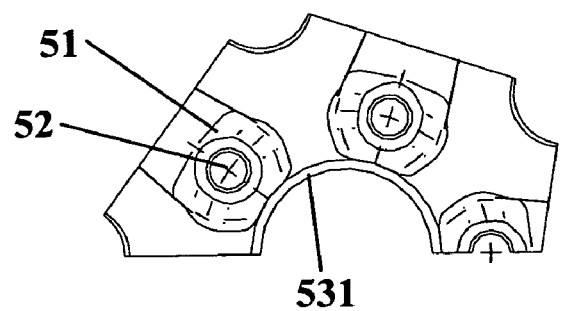
FIGS. 10, 11 and 12 are partial views of FIG. 5 and show modified embodiments of the centering vent.
Figure 11:
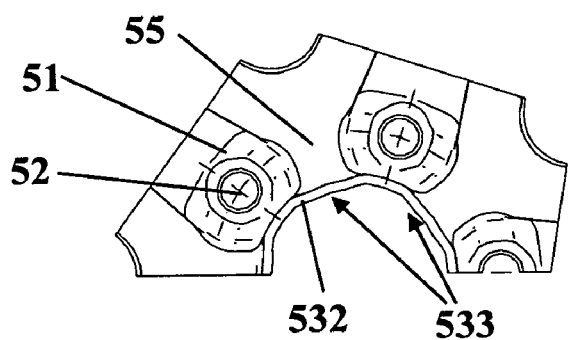
Figure 12:
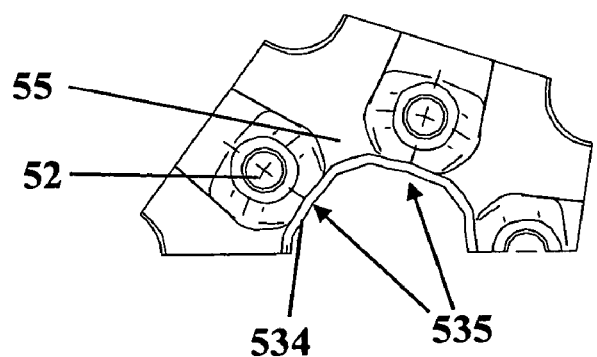

FIGS. 10, 11 and 12 show three particular embodiments of the geometry of the centering vent 53. FIG. 10 shows the usual embodiment with a circular centering vent 531. The assembly of the radially inner face is in contact with the centering lug of the vehicle wheel hub.

For matters of ease of industrial execution as well as precision of centering, it may be advantageous to provide preferred centering ranges. FIG. 11 shows a first preferred example. The centering vent 532 has five centering ranges 533 disposed to the right of the yokes 55. In FIG. 12, the centering vent 534 has five centering ranges 535 disposed to the right of the fixing apertures 52.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. Wheel disc formed from a single piece of embossed sheet metal and comprising:
    a radially outer circular assembling part adapted to be connected to a rim;
    a radially inner part spaced radially inwardly from the outer part for fixing and centering to a wheel hub, the inner part including:
        a bearing region facing axially inwardly and defining a plane;
        a radially inner edge bent axially outwardly for forming a centering aperture defining a center axis of the wheel disk, the axis extending perpendicularly to the plane of the bearing region;
        a plurality of fixing apertures disposed radially outwardly of the axis and spaced circumferentially around the axis, and
        a plurality of yokes alternating circumferentially with the fixing apertures, each yoke defined by a bent portion of the piece of sheet metal and forming a generally concave side facing axially outwardly, and a generally convex side facing axially inwardly, wherein an axially inner surface of the yoke is offset axially outwardly from the plane of the bearing region; and
    generally radially extending spokes interconnecting the inner part with a radially inner edge of the outer part, the spokes being circumferentially spaced apart to define perforations between adjacent spokes, each spoke being generally radially aligned with a respective fixing aperture and extending generally radially outwardly from adjacent such fixing aperture to a location at least as far as the radially inner edge of the outer part, each spoke including lateral portions spaced circumferentially apart, and an axially outwardly open pocket disposed circumferentially between the lateral portions, wherein an axial dimension of the pocket recedes from its radial inner end to its radial outer end.

2. Disc according to claim 1, wherein, taking into account a median axial plane between two adjacent fixing apertures, the axial distance separating the internal face of the yokes and the internal face of the bearing region is at all points greater than the initial thickness of the sheet metal forming the wheel disc.

3. Disc according to claim 1, wherein each pocket has a floor and a single, closed side surrounding the floor.

4. Disc according to claim 1 wherein the spokes have free lateral edges which are turned towards the inner face of the disc.

5. Disc according to claim 4, wherein the spokes have a substantially M-shaped section.

6. Disc according to claim 4, wherein at a given radial distance, axially inwardly facing faces of the free lateral edges are offset axially outwards relative to the axially inwardly facing face of the floor of the pocket of the spoke.

7. Disc according to claim 1, wherein the radially inner free edges of the circular assembling part are folded towards the inner face of the disc.

8. Disc according to claim 1, wherein the perforations are obtained by punching the sheet metal and then folding the edges towards the inner face of the disc.

9. Disc according to claim 1, wherein the pockets have a generally flattened oval shape with a width that decreases continuously in the circumferential direction from the fixing and centering part towards the outer circular part.

10. Disc according to claim 1, wherein the pockets have a depth that decreases continuously from the fixing and centering part to the radially outer circular part.

11. Disc according to claim 1, wherein the width in the circumferential direction of the spokes decreases continuously from the radially inner part to the radially outer circular part.

12. Disc according to claim 1, wherein the section of the spokes decreases continuously from the radially inner part to the radially outer circular part.

13. Disc according to claim 1, wherein the bending resistance of the spokes decreases continuously from the central part to the outer part.

14. Disc according to claim 1, wherein the bearing region has at least two distinct bearing faces around each fixing aperture.

15. Disc according to claim 14, wherein, relative to the axis of a fixing apertures, the bearing region has at least one first bearing face disposed radially inward and two other bearing faces disposed axially outward and circumferentially on either side of the axis.

16. Disc according to claim 15, wherein the floor of the pockets has punched apertures.

17. Disc according to claim 1, wherein the final shape of the spokes and of the perforations is obtained simultaneously in one or more embossing operations.

18. Disc according to claim 1, wherein, after being cut out, the edges of the perforations are trimmed from an embossed part before being turned.

19. Disc according to claim 1, wherein the radially inner part of the centering aperture has preferred bearing ranges opposite to each fixing aperture.

20. Disc according to claim 1, wherein the radially inner part of the centering has preferred bearing ranges opposite to each yoke separating the fixing apertures.

21. Disc according to claim 1, wherein the number of spokes is three, four, five or six.

22. A wheel including a rim and a disc, the disc comprising:
    a radially outer circular assembling part adapted to be connected to a rim;
    a radially inner part spaced radially inwardly from the outer part for fixing and centering to a wheel hub, the inner part including:
        a bearing region facing axially inwardly and defining a plane;
        a radially inner edge bent axially outwardly for forming a centering aperture defining a center axis of the wheel disk, the axis extending perpendicularly to the plane of the bearing region;
        a plurality of fixing apertures disposed radially outwardly of the axis and spaced circumferentially around the axis, and
        a plurality of yokes alternating circumferentially with the fixing apertures, each yoke defined by a bent portion of the piece of sheet metal and forming a generally concave side facing axially outwardly, and a generally convex side facing axially inwardly, wherein an axially inner surface of the yoke is offset axially outwardly from the plane of the bearing region; and
    generally radially extending spokes interconnecting the inner part with a radially inner edge of the outer part, the spokes being circumferentially spaced apart to define perforations between adjacent spokes, each spoke being generally radially aligned with a respective fixing aperture and extending generally radially outwardly from adjacent such fixing aperture to a location at least as far as the radially inner edge of the outer part, each spoke including lateral portions spaced circumferentially apart, and an axially outwardly open pocket disposed circumferentially between the lateral portions, wherein an axial dimension of the pocket recedes from its radial inner end to its radial outer end.

23. Wheel disc formed from a single piece of embossed sheet metal, with an axially outer face and an axially inner face and comprising:
    a radially outer circular assembling part adapted to be connected to a rim,
    a radially inner part for fixing and centering to a wheel hub with a bearing region having a given number of fixing apertures and ending radially inwardly with an edge bent down axially outwardly to define a centering aperture,
    a plurality of yokes alternating circumferentially with the fixing apertures, each yoke defined by a bent portion of the piece of sheet metal and forming a generally concave side facing axially outwardly, and a generally convex side facing axially inwardly, wherein an axially inner surface of the yoke is offset axially outwardly from the plane of the bearing region: and
    spokes connecting the inner and outer parts, each spoke being disposed substantially radially opposite to one of the fixing apertures and the radially inner free edges of the radially outer circular part defining perforations with the lateral free edges of the spokes,
    wherein, in order to reinforce each spoke mechanically, a pocket is housed, set back radially inward relative to the outer face of the disc, the pocket extending radially from the centering aperture, and including one of the fixing apertures and the adjacent part of the bearing region along the central part of the spokes and as far as the outer circular assembling part, and wherein the outer face connects each spoke to the centering aperture by a yoke offset axially outward relative to the bearing region, wherein the pockets have a depth that decreases continuously from the fixing and centering part to the radially outer circular part.

24. Wheel disc formed from a single piece of embossed sheet metal, with an axially outer face and an axially inner face and comprising:
    a radially outer circular assembling part adapted to be connected to a rim,
    a radially inner part for fixing and centering to a wheel hub with a bearing region having a given number of fixing apertures and ending radially inwardly with an edge bent down axially outwardly to define a centering aperture,
    a plurality of yokes alternating circumferentially with the fixing apertures, each yoke defined by a bent portion of the piece of sheet metal and forming a generally concave side facing axially outwardly, and a generally convex side facing axially inwardly, wherein an axially inner surface of the yoke is offset axially outwardly from the plane of the bearing region; and
    spokes connecting the inner and outer parts, each spoke being disposed substantially radially opposite to one of the fixing apertures and the radially inner free edges of the radially outer circular part defining perforations with the lateral free edges of the spokes,
    wherein, in order to reinforce each spoke mechanically, a pocket is housed, set back radially inward relative to the outer face of the disc, the pocket extending radially from the centering aperture, and including one of the fixing apertures and the adjacent part of the bearing region along the central part of the spokes and as far as the outer circular assembling part, and wherein the outer face connects each spoke to the centering aperture by a yoke offset axially outward relative to the bearing region, wherein the width in the circumferential direction of the spokes decreases continuously from the radially inner part to the radially outer circular part.

25. Wheel disc formed from a single piece of embossed sheet metal, with an axially outer face and an axially inner face and comprising:

a radially outer circular assembling part adapted to be connected to a rim, a radially inner part for fixing and centering to a wheel hub with a bearing region having a given number of fixing apertures and ending radially inwardly with an edge bent down axially outwardly to define a centering aperture, a plurality of yokes alternating circumferentially with the fixing apertures, each yoke defined by a bent portion of the piece of sheet metal and forming a generally concave side facing axially outwardly, and a generally convex side facing axially inwardly, wherein an axially inner surface of the yoke is offset axially outwardly from the plane of the bearing region; and spokes connecting the inner and outer parts, each spoke being disposed substantially radially opposite to one of the fixing apertures and the radially inner free edges of the radially outer circular part defining perforations with the lateral free edges of the spokes, wherein, in order to reinforce each spoke mechanically, a pocket is housed, set back radially inward relative to the outer face of the disc, the pocket extending radially from the centering aperture, and including one of the fixing apertures and the adjacent part of the bearing region along the central part of the spokes and as far as the outer circular assembling part, and wherein the outer face connects each spoke to the centering aperture by a yoke offset axially outward relative to the bearing region, wherein the bending resistance of the spokes decreases continuously from the central part to the outer part.

* * * * *